US006597867B2

(12) United States Patent
Nakahara

(10) Patent No.: US 6,597,867 B2
(45) Date of Patent: Jul. 22, 2003

(54) DISTANCE MEASURING APPARATUS

(75) Inventor: Naoto Nakahara, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/930,250

(22) Filed: Aug. 16, 2001

(65) Prior Publication Data

US 2002/0021896 A1 Feb. 21, 2002

(30) Foreign Application Priority Data

Aug. 17, 2000 (JP) ........................................ 2000-247764

(51) Int. Cl.[7] .............................. G03B 3/00; G03B 13/34
(52) U.S. Cl. ........................................ 396/104; 396/121
(58) Field of Search .......................... 396/104, 89, 96, 396/121; 348/294, 301, 353; 250/201.7

(56) References Cited

U.S. PATENT DOCUMENTS 5,027,148 A * 6/1991 Anagnostopoulos ........ 348/243
5,200,602 A * 4/1993 Ikebe et al. .............. 250/201.6

* cited by examiner

*Primary Examiner*—Russell Adams
*Assistant Examiner*—Arthur A Smith
(74) *Attorney, Agent, or Firm*—Greenblum & Bernstein, P.L.C

(57) ABSTRACT

A distance measuring apparatus for a camera having a plurality of distance measurement zones, includes a light receiving device having a plurality of light sensors which output analog pixel signals corresponding to the amount of light received; an A/D converter which converts each analog pixel signal into digital pixel data; a logarithmic transformation device which performs logarithmic transformation on each digital pixel data at a predetermined logarithmic transformation range to obtain a first transformation data; a determination device which determines the contrast state of each distance measurement zone based on the first transformation data; a calculation device which calculates an average relative object brightness based on the first transformation data; and a control device which obtains a second transformation data by performing logarithmic transformation again by utilizing a predetermined object brightness range including the average relative object brightness in the distance measurement zone as a logarithmic transformation range.

11 Claims, 12 Drawing Sheets

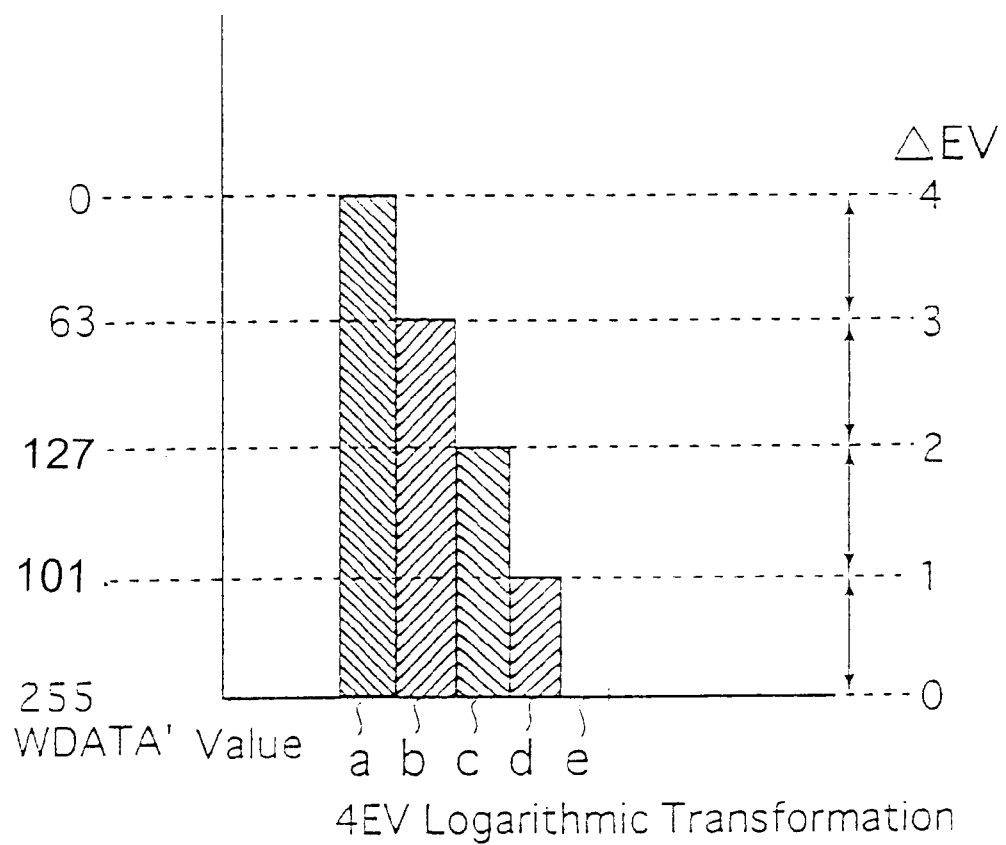

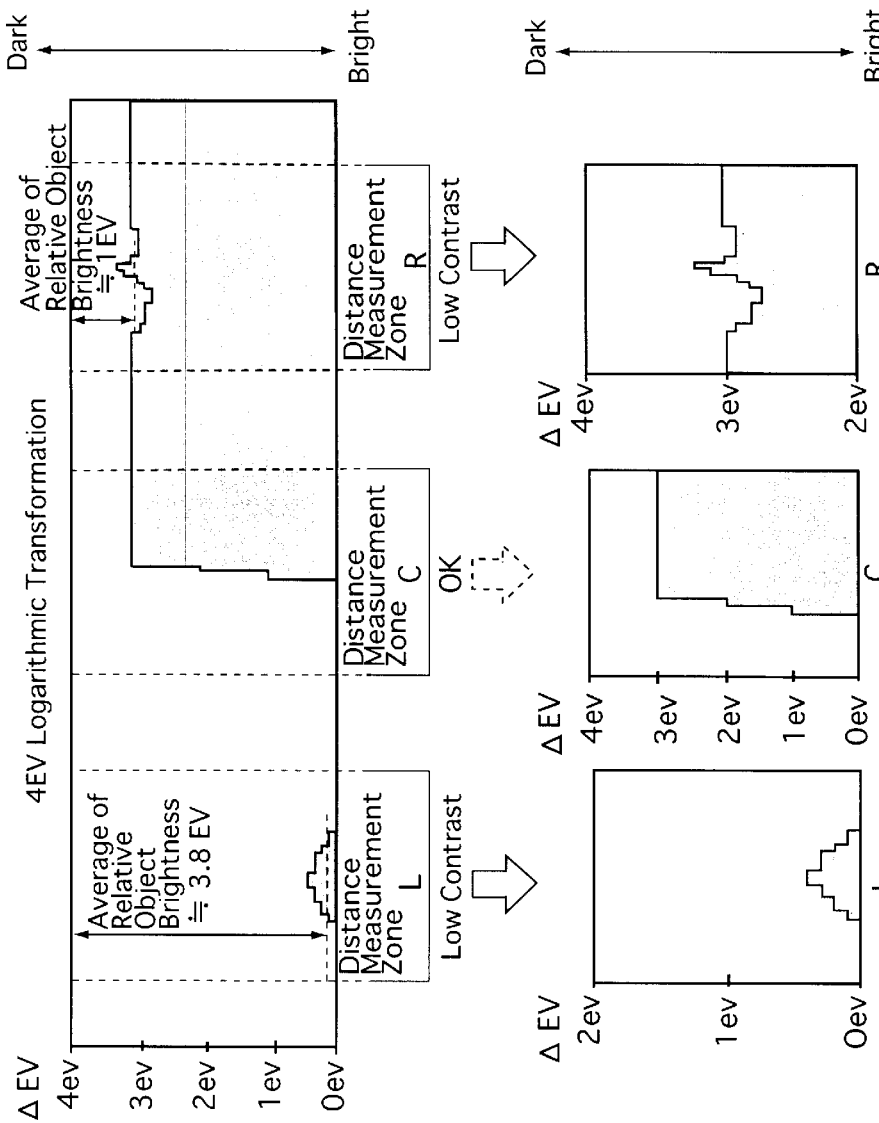

DISTANCE MEASURING APPARATUS

BACKGROUND OF THE INVENTION

1. Field of the Invention

The present invention relates to a passive-type distance measuring apparatus that is provided with a distance measuring sensor which converts incident light into an analog signal.

2. Description of the Related Art

A conventional passive-type distance measuring apparatus, which is widely used as a passive-type AF system for AF cameras, divides the image viewed through a predetermined distance measuring zone (e.g., a focus detection zone in the case of an AF camera) into two images via a pair of separator optical systems, to be respectively formed as two separate images (right and left images) on a corresponding pair of line sensors (right and left sensors). Each line sensor includes an array of photodiodes (an array of photoelectric conversion elements). Each photodiode converts the received light into an electric charge and accumulates (integrates) the electric charge. Thereafter, the accumulated electric charges are read out of each photodiode, in order, as a pixel signal (voltage). In accordance with the pixel signals output from the pair of line sensors, a predetermined distance measuring process is performed to obtain data such as the amount of defocus or the object distance that is necessary for bringing the object into focus. However, in the case where this passive-type distance measuring apparatus uses a distance measuring sensor which converts the incident light into an analog pixel signal, an accurate calculated distance value/amount of defocus cannot be attained by merely converting an analog pixel signal output from the distance measuring sensor into a digital signal and using the digital signal in a predetermined distance measuring calculation if the brightness and/or the contrast of an object is low due to, for example, the resolving power of a low brightness portion of the digital signal being low, so that the accuracy of measurement deteriorates.

SUMMARY OF THE INVENTION

It is an object of the present invention to provide a distance measuring apparatus in which the accuracy of measurement can be increased and the time necessary for measurement can be shortened.

To achieve the object mentioned above, according to the present invention, a distance measuring apparatus is provided for a camera having a plurality of distance measurement zones, including a light receiving device having a plurality of light sensors, wherein each of the light sensors receives light from an object in each of the distance measurement zones and outputs an analog pixel signal corresponding to the amount of light received; an A/D converter which converts each of the analog pixel signals into digital pixel data; a logarithmic transformation device which performs logarithmic transformation on each of the digital pixel data at a predetermined logarithmic transformation range to obtain a first transformation data; a determination device which determines a contrast state of each of the distance measurement zones based on the first transformation data in each of the distance measurement zones; a calculation device which calculates an average relative object brightness based on the first transformation data in each of the distance measurement zones; and a control device which obtains a second transformation data by performing logarithmic transformation again via the logarithmic transformation device on each of the digital pixel data in the distance measurement zone, which has been determined by the determination device as having a low contrast, by utilizing a predetermined object brightness range, including the average relative object brightness in the distance measurement zone, as a logarithmic transformation range.

Preferably, the calculation device further calculates distance measurement based on the first transformation data in the distance measurement zone which has been determined by the determination device as not having a low contrast, and the calculation device further performs distance measurement based on the second transformation data in the distance measurement zone which contrast has been determined by the determination device as having a low contrast.

Preferably, the calculation device subtracts the first transformation data from a predetermined reference value to thereby obtain a converted value, in order to obtain an average relative object brightness of each of the distance measurement zones by averaging the converted value per distance measurement zone.

Preferably, the determination device obtains a difference between a maximum value and a minimum value of the first transformation data in each of the distance measurement zones, and determines that a contrast of distance measurement zones is low when the difference is equal to or smaller than a predetermined value.

Preferably, the control device instructs the logarithmic transformation device to perform a logarithmic transformation in a logarithmic transformation range narrower than the predetermined logarithmic transformation range.

Preferably, at least one memory is provided for storing each of the digital pixel data, the first transformation data and the second transformation data.

According to another aspect of the present invention, a distance measuring apparatus is provided for a camera having a plurality of distance measurement zones, including a light receiving device having a plurality of light sensors, wherein each of the light sensors receives light from an object in each of the distance measurement zones and outputs an analog pixel signal corresponding to the amount of light received; an A/D converter which converts each of the analog pixel signals into digital pixel data; a logarithmic transformation device which performs logarithmic transformation on each of the digital pixel data at a predetermined logarithmic transformation range to obtain a first transformation data; a determination device which determines a contrast state of each of the distance measurement zones based on the first transformation data in each of the distance measurement zones; a calculation device which calculates an average relative object brightness based on the first transformation data of the distance measurement zone which has been determined by the determination device as having a low contrast; and a control device which obtains a second transformation data by performing logarithmic transformation again via the logarithmic transformation device on each of the digital pixel data in the distance measurement zone by utilizing a predetermined object brightness range, including the average relative object brightness in the distance measurement zone, as a logarithmic transformation range.

The present disclosure relates to subject matter contained in Japanese Patent Application No. 2000-247764 (filed on Aug. 17, 2000) which is expressly incorporated herein by reference in its entirety.

BRIEF DESCRIPTION OF THE DRAWINGS

The present invention will be described below in detail with reference to the accompanying drawings in which:

FIG. 6C is a graph showing 4EV sensor data wherein a logarithmic transformation is performed on each of the digital pixel data on the photodiodes 'a' through 'e' shown in FIG. 6B;

FIG. 7A is a graph showing 4EV sensor data in distance measurement zones L, C and R, by way of example;

FIG. 7B is a graph showing 2EV sensor data wherein a logarithmic transformation is performed in the distance measurement zone L shown in FIG. 7A;

FIG. 7C is a graph showing 4EV sensor data wherein a logarithmic transformation is performed in the distance measurement zone C shown in FIG. 7A;

FIG. 7D is a graph showing 2EV sensor data wherein a logarithmic transformation is performed in the distance measurement zone R shown in FIG. 7A;

DESCRIPTION OF THE PREFERRED EMBODIMENTS

Figure 1:
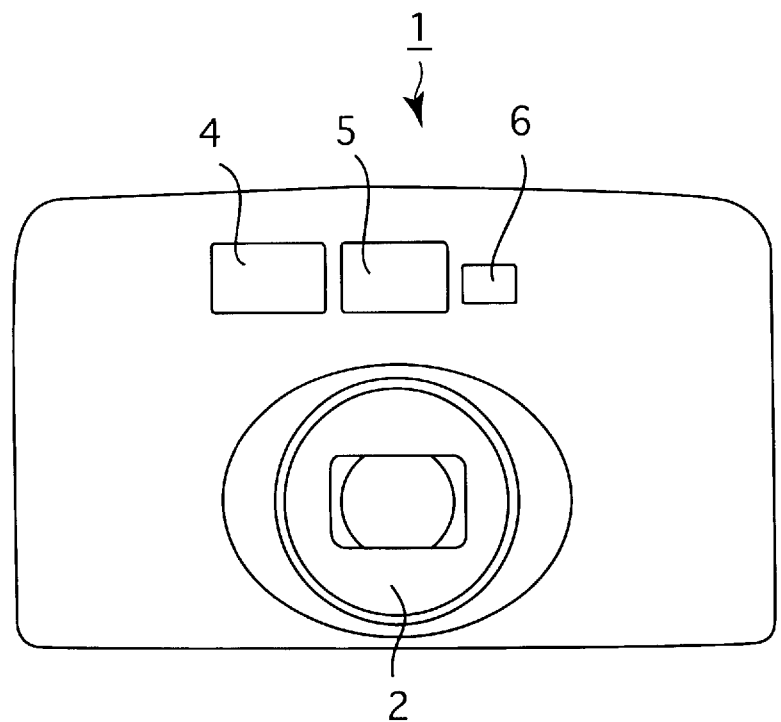
FIG. 1 is a front view of an embodiment of a lens-shutter camera having a distance measuring device according to the present invention.
Figure 2:
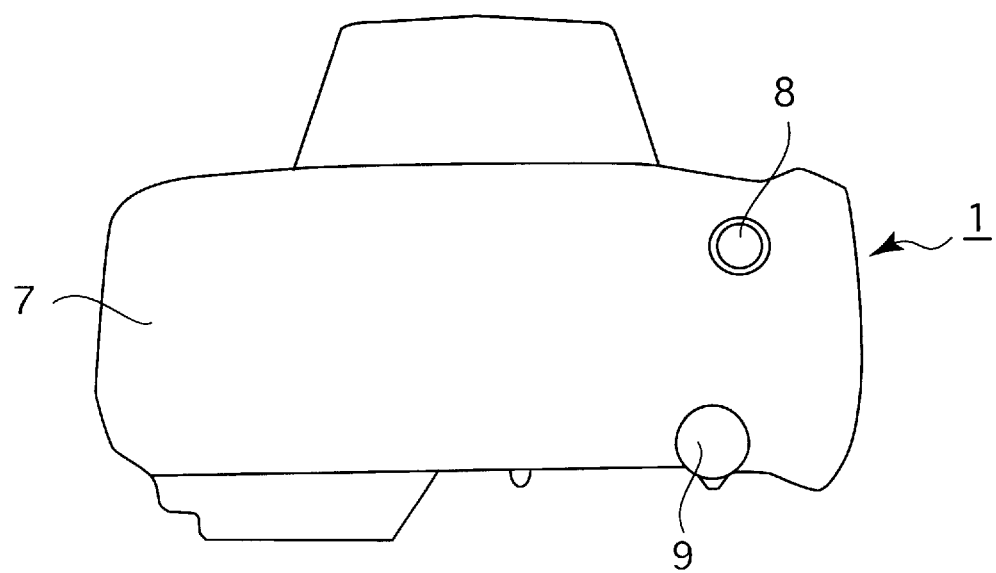
FIG. 2 is a plan view of the lens-shutter camera shown in FIG. 1.
Figure 3:
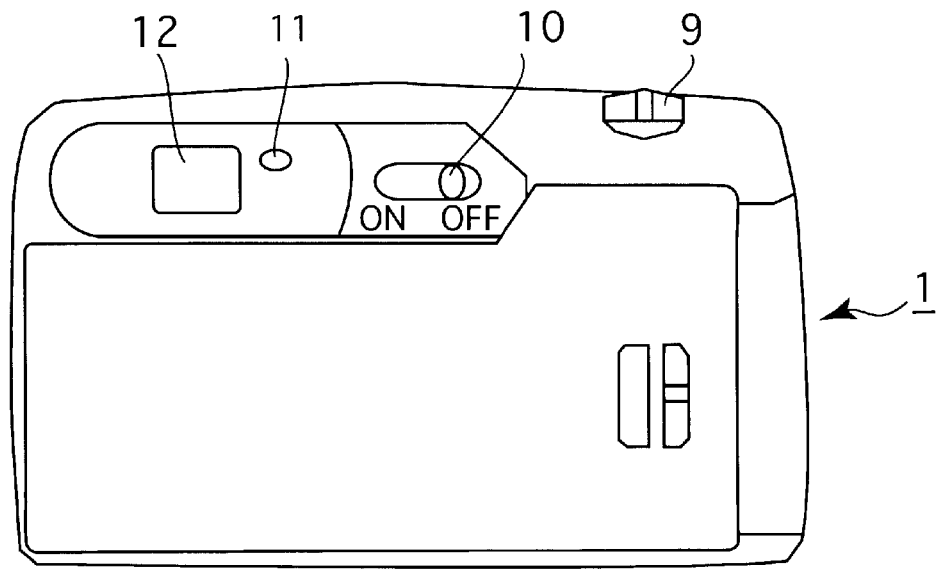
FIG. 3 is a rear view of the lens-shutter camera shown in FIG. 1.

FIGS. 1 through 3 show an embodiment of a lens-shutter AF camera according to the present invention. A camera 1 is provided on the front thereof with a zoom lens 2. The camera 1 is provided on the front thereof above the zoom lens 2 with a passive AF light receiving window 4, a viewfinder window 5 and a photometering window 6. The camera 1 is provided therein behind the passive AF light receiving window 4, the viewfinder window 5, and the photometering window 6 with a distance measuring sensor (passive AF sensor) 36 (see FIG. 5), a viewfinder optical system (not shown) and a photometering sensor 37a (see FIG. 4), respectively.

The camera 1 is provided on a top panel 7 thereof with a release button 8. The release button 8 is interconnected with a photometering switch SWS and a release switch SWR (see FIG. 4) so that the photometering switch SWS and the release switch SWR are turned ON if the release button 8 is depressed by a half step and a full step, respectively.

The camera 1 is provided at a rear upper center position thereof with a main switch knob 10 that is interconnected with a main switch (power switch) SWM (see FIG. 4) so that the main switch SWM is turned ON and OFF if the main switch knob 10 is moved left and right, respectively, as viewed in FIG. 3. The camera 1 is provided at a rear upper right position thereof with a zooming knob 9 which is manually operated to drive the zoom lens 2 in a telephoto direction or a wide-angle direction. The zooming knob 9 is interconnected with a telephoto switch SWT and a wide-angle switch SWW (see FIG. 4) so that the telephoto switch SWT and the wide-angle switch SWW are turned ON if the zooming knob 9 is moved to a telephoto side (e.g., the right side as viewed in FIG. 3) and a wide-angle side (e.g., the left side as viewed in FIG. 3), respectively. Each of the telephoto switch SWT and the wide-angle switch SWW is turned OFF when the zooming knob 9 is in a neutral position shown in FIGS. 2 and 3. The camera 1 is provided at a rear upper left position thereof with an eyepiece window 12. The camera 1 is provided, on the rear thereof in the vicinity of the eyepiece window 12, with a green light emitter (e.g., a green LED) 11. The green light emitter 11 is controlled to light up or flash ON and OFF (blink) depending on the result of distance measurement.

Figure 4:
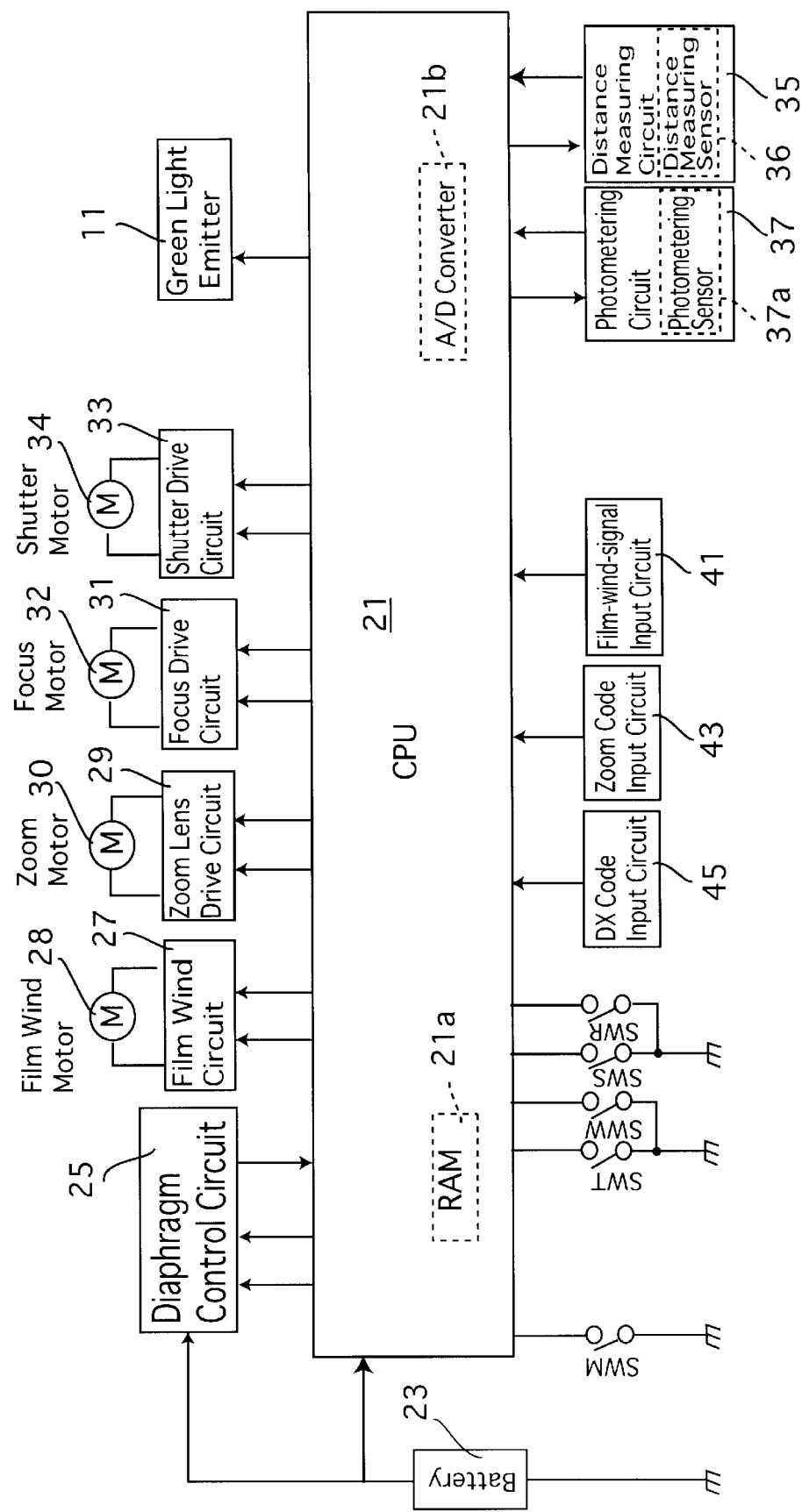
FIG. 4 is a block diagram of fundamental elements of a control system provided in the lens-shutter camera shown in FIG. 1.

Fundamental elements of a control system of the camera 1 will be hereinafter discussed in detail with reference to FIG. 4. The control system includes the green light emitter 11, a CPU (logarithmic transformation device/determination device/calculation device/control device) 21, a battery 23, a diaphragm control circuit 25, a film wind circuit 27, a zoom lens drive circuit 29, a focus drive circuit 31, a shutter drive circuit 33, a distance measuring circuit 35 and a photometering circuit (photometering device) 37. The control system further includes a film-wind-signal input circuit 41, a zoom code input circuit 43, a DX code input circuit 45, the photometering switch SWS, the release switch SWR, the telephoto switch SWT, the wide-angle switch SWW, and the main switch SWM. The control system further includes a film wind motor 28, a zoom motor 30, a focus motor 32, and a shutter motor 34 which are connected to the film wind circuit 27, the zoom lens drive circuit 29, the focus drive circuit 31 and the shutter drive circuit 33, respectively. The CPU 21 is provided therein with a ROM (not shown), a RAM (memory) 21a and an A/D converter 21b. Various parameters for determining control or calculation are temporarily stored in the RAM 21a, while programs for various functions of the camera 1 are written in the ROM. The CPU 21 comprehensively controls the overall operations of the camera 1.

The main switch SWM (which is interconnected with the main switch knob 10), the telephoto switch SWT and the wide-angle switch SWW (which are both interconnected with the zooming knob 9), and the photometering switch SWS and the release switch SWR (which are both interconnected with the release button 8), are electrically connected to the CPU 21.

Upon the main switch SWM being turned ON, the CPU 21 starts supplying power from the battery 23 to peripheral circuits which are connected to input/output ports of the CPU 21 to perform operations corresponding to operations of the various above-mentioned switches.

Upon the telephoto switch SWT being turned ON, the CPU 21 starts driving the zoom motor 30 via the zoom lens drive circuit 29 to move the zoom lens 2 in a telephoto direction. Likewise, upon the wide-angle switch SWW being turned ON, the CPU 21 starts driving the zoom motor 30 via the zoom lens drive circuit 29 to move the zoom lens 2 in a wide-angle direction. The focal length of the zoom lens 2 and the axial position thereof are detected by the zoom code input circuit 43. Upon the main switch SWM being turned ON, the CPU 21 controls the zoom motor 30 to keep rotating forwardly until the zoom lens 2 advances to the wide-angle extremity thereof. Upon the main switch SWM being turned OFF, the CPU 21 controls the zoom motor 30 to keep rotating reversely until the zoom lens 2 retracts into the retracted position thereof, at which the zoom lens 2 is fully retracted in the camera body.

The CPU 21 calculates an object brightness via the photometering circuit 37 upon the release button 8 is half-depressed and the photometering switch SWS being turned ON. The photometering circuit 37 is provided with a photometering sensor 37a for receiving light from the object through the photometering window 6. The photometering circuit 37 outputs a photometric signal which corresponds to the object brightness to the CPU 21. The photometering sensor 37a is provided with a multi-segment photometering sensor, so that the camera measures and compares photometric readings in segmented areas of the photographic field.

Thereafter, the CPU 21 performs an AE calculation process in accordance with the calculated object brightness, and the ISO film speed input via the DX code input circuit 45, to calculate the optimum shutter speed and the optimum aperture value. The DX code input circuit 45 reads DX code printed on a film cartridge (not shown) loaded in the camera body 1 to output the ISO film speed, the number of exposures, and other information on the loaded film to the CPU 21.

The CPU 21 performs a predetermined image process for processing an analog pixel signal input from the distance measuring circuit 35, and subsequently performs distance measuring calculations for the respective distance measurement zones in accordance with the processed pixel signal. If the calculated distance value (amount of defocus) obtained by the distance measuring calculation is effective, the CPU 21 calculates the amount of driving of the focus motor 32 (LL data) for driving a focusing lens group (not shown) of the zoom lens 2 to drive the focus motor 32 via the focus drive circuit 31, and at the same time, the CPU 21 turns ON the green light emitter 11. If the calculated distance value is not effective, the CPU 21 makes the green light emitter 11 to flash ON and OFF (blink) to inform the user that the distance measuring calculation ended in failure.

Figure 5:
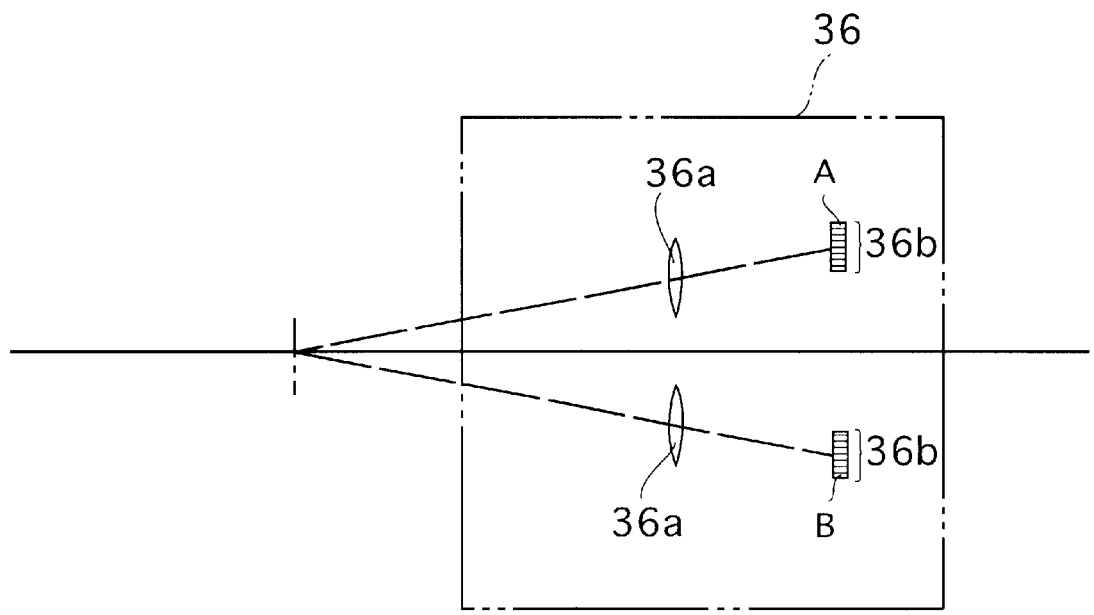
FIG. 5 is a schematic diagram of a distance measuring sensor provided in the lens-shutter camera shown in FIG. 1.

The distance measuring circuit 35 detects a focus state of the object image formed within each of the distance measurement zones (focus detection zones) of the photographic field. The distance measuring circuit 35 is provided with the distance measuring sensor (light receiving device) 36 which converts the received object light into an electrical pixel signal (electric charges) and to output the pixel signal. FIG. 5 shows a schematic structure of the distance measuring sensor 36. The distance measuring sensor 36, which is disposed behind the passive AF light receiving window 4, is provided with a pair of separator lenses 36a and a corresponding pair of line sensors 36b ("A" and "B" of the line sensors 36b shown in FIG. 5). The image observed through each of the distance measurement zones is respectively divided into two by the pair of separator lenses to be formed as two separate images on the corresponding pair of line sensors 36b. Each line sensor 36b is provided with an array of photodiodes (photoelectric conversion elements), the details thereof not being shown. Each photodiode of each line sensor 36b receives the split object light bundles, converts the light into an electric charge and accumulates (integrates) the electric charges. The electric charges obtained by the integration process at each photodiode of each line sensor 36b are successively converted to a voltage for each pixel and is output as a pixel signal for each pixel to the main CPU 21.

In the illustrated embodiment, the line sensor 36b is formed so as to measure the distance of objects in the three distance measurement zones respectively, i.e. a distance measurement zone C corresponding to the center of the photographing view (not shown), a distance measurement zone R corresponding to the right thereof, and a distance measurement zone L corresponding to the left thereof.

When the release button 8 is fully-depressed so that the release switch SWR is turned ON, the CPU 21 controls the diaphragm control circuit 25 to stop down the diaphragm of the zoom lens 2 in accordance with the determined aperture value. At the same time, the CPU 21 actuates the shutter motor 34 to release the shutter via the shutter control circuit 33 in accordance with the determined shutter speed.

Upon completion of an exposure, the CPU 21 drives the film wind motor 28 to rotate forwardly via the film wind circuit 27 to wind the film by one frame while a film wind signal is input via the film-wind-signal input circuit 41. However, after the last frame of the film is exposed, the CPU 21 drives the film wind motor 28 to rotate reversely via the film wind circuit 27 to rewind the film.

In addition to the aforementioned fundamental elements, the camera 1 is further provided with various known devices such as a self-timer light indicator which indicates that the self timer is in operation, a flashlight emitter which emits flashlight under control of the CPU 21, and an LCD panel which indicates various photographic information.

Figure 6A:
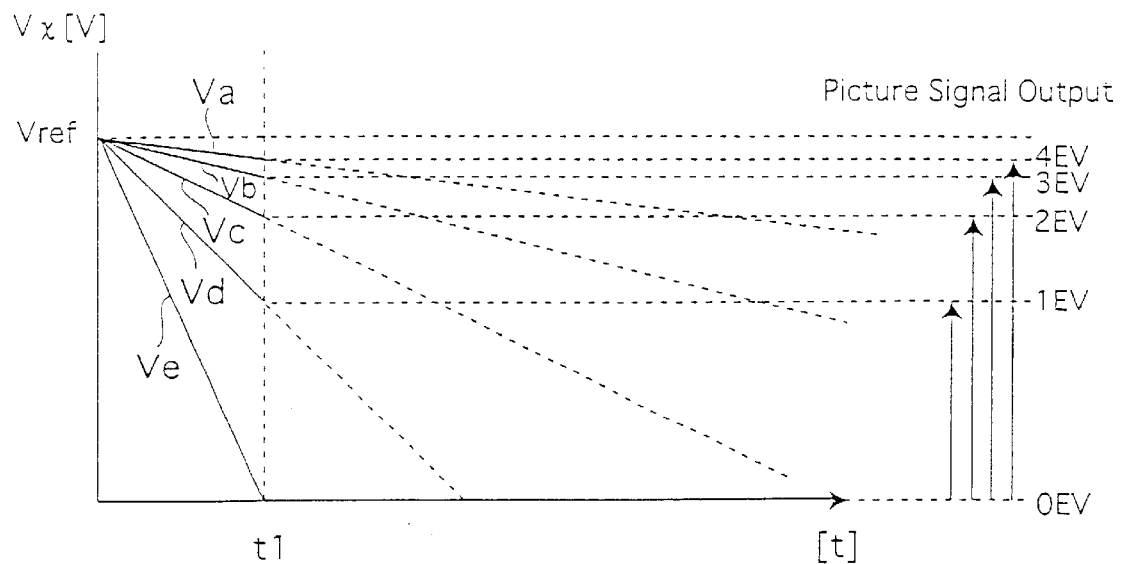
FIG. 6A is a graph showing the relationship between a pixel signal (V$\chi$) output from the distance measuring sensor shown in FIG. 5 and time (t), by way of example.

FIG. 6A is a graph showing the relationship between a pixel signal Vχ (voltage: Va, Vb, Vc, Vd or Ve) output from the corresponding photodiode (a, b, c, d or e; not shown) on each line sensor 36b of the distance measuring sensor 36, and time (t), by way of example. In FIG. 6A, 'Vref' represents the reference voltage. As time elapses, the voltage of the pixel signal Vχ descends from the reference voltage Vref by the amount of charges integrated by each photodiode. The CPU 21 controls each photodiode of each line sensor 36b to stop integrating charges at the time the voltage of the pixel signal Vχ (Va, Vb, Vc, Vd or Ve) output from either line sensor reaches zero volts (0V), or a predetermined maximum integration time elapses. Zero volts (0V) is herein determined as the integration completion value (voltage). As the object brightness becomes higher, the time necessary for the voltage of the pixel signal Vχ to reach the integration completion value becomes shorter. Accordingly, it can be understood from FIG. 6A that the inclination of the line showing the voltage of the pixel signal Vχ is in proportion to the object brightness, and the greater the absolute value of the inclination of the line showing the pixel signal Vχ, the higher the object brightness.

In FIG. 6A, a pixel signal Ve of the highest brightness is determined as a reference value (0EV), while EV values (0EV through 4EV in FIG. 6A) are determined as values which vary relative to the pixel signal Ve, so that the greater the pixel signal V$\chi$, i.e., the lower the object brightness, the greater the EV value. In FIG. 6A, five pixel signals Va, Vb, Vc, Vd and Ve are indicated in increments of 1EV.

Figure 6B:
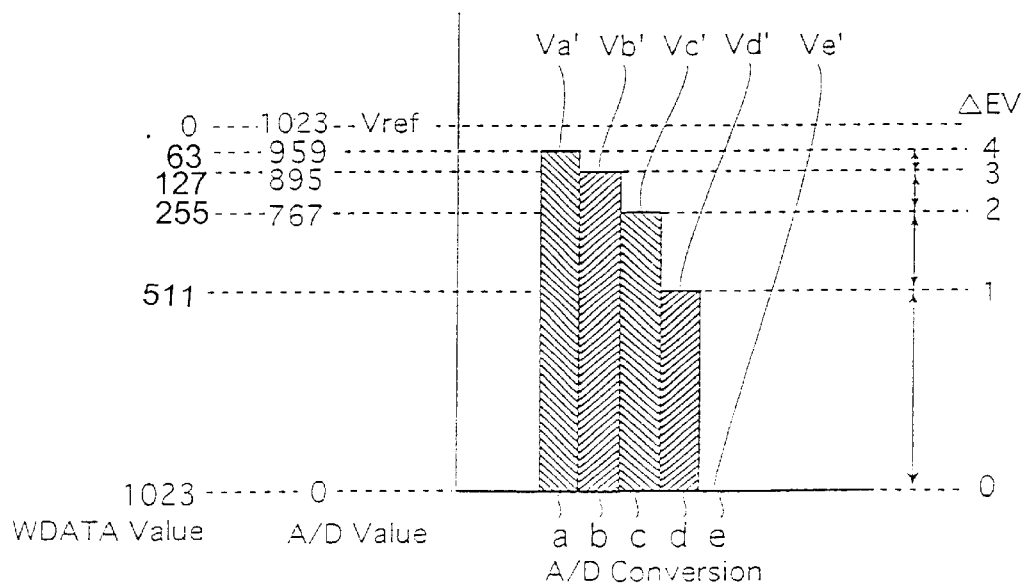
FIG. 6B is a graph showing digital pixel data, wherein analog pixel signals Va through Ve output from the distance measuring sensor shown in FIG. 5 at the time 't1' are converted into the digital pixel data on the photodiodes 'a' through 'e' in the range of 0(V) to Vref, respectively.

The integration completion time of the pixel signal Ve, the integrating operation of which completes first in FIG. 6A, is determined as time t1, while digital pixel data on the photodiodes 'a' through 'e', which are respectively obtained by converting the pixel signals Va through Ve into a 10-bit digital form at the time t1 in the range of 0(V) to Vref', are indicated in FIG. 6B as digital pixel data Va' through Ve'. Note that the vertical axis of FIG. 6B shows the digital pixel data V$\chi$' (A/D conversion value), and the horizontal axis of FIG. 6B shows the reference signs given to each of the photodiodes of the line sensor 36$b$. Accordingly, the higher the object brightness becomes, the lower the height of the graph becomes.

$\Delta$EV represents the value (converted value) obtained by subtracting the brightness corresponding to the picture data V$\chi$' from that corresponding to the reference voltage Vref. Assuming that the value Vref' represents the 10-bit A/D converted form of the reference voltage Vref, the difference value $\Delta$EV may be obtained by the formula '$\Delta$EV=log$_2$ (Vref'−V$\chi$')'. Note that the difference in the brightness value $\Delta$EV in the range of 0(V) to Vref' corresponds to $\Delta$10EV.

As shown in the digital pixel data (A/D conversion value) of FIG. 6B, the resolving power of a low brightness portion is lower than that of a high brightness portion. Therefore, in the illustrated embodiment, the digital pixel data shown in FIG. 6B is subject to a 4EV logarithmic transformation so that the distance measuring accuracy can improve, accordingly 4EV transformation data shown in FIG. 6C is obtained. 4EV logarithmic transformation refers to a four-step logarithmic transformation on the pixel signal within the reference object brightness range (0 through 255) by determining the brightest pixel signal Ve' in FIG. 6B as the reference 0EV so that the difference of object brightness from the reference 0EV is between $\Delta$0EV and $\Delta$4EV. In the illustrated embodiment, the 4EV logarithmic transformation data is obtained by converting each of the digital pixel data on the photodiodes 'a' through 'e' into a corresponding 8-bit data (0 through 255 steps) while dividing the resolution power at 1EV into 64 steps.

The resolution power at the low brightness portion is substantially the same as that of the high brightness portion, and when the object distance determining calculation is carried out based on this 4EV transformation data, in most cases a correct object distance can be obtained. Even when a correct object distance is not obtained in this calculation, it is still possible to carry out again the logarithmic transformation after changing the transformation range, whereby the object distance determination calculation can be performed again, based on this 4EV transformation data thus obtained, until the correct object distance is eventually obtained. However, if the contrast of object is low, there may be often the case that the correct object distance cannot be obtained at all. In this case, the time spent in the repeated calculations to measure the object distance is wasteful.

In view of this problem, in the illustrated embodiment, when the contrast in the distance measurement zone is low, the object brightness range, in which the logarithmic transformation on the above discussed digital pixel data is carried out, is changed. More specifically, according to the illustrated embodiment, the contrast state of each distance measurement zone is determined based on the obtained 4EV transformation data, and if there is any distance measurement zone in which the contrast is sufficiently high, the distance measurement is carried out based on the corresponding 4EV transformation data (a first transformation data).

On the other hand, if there is any distance measurement zone in which the contrast is low, the digital image is subject to a 2EV logarithmic transformation in order to obtain a 2EV transformation data shown in FIG. 7B or 7D, whereby high resolving power is obtained in a predetermined object brightness range of the low-contrast distance measurement zone covering the average relative object-brightness. The 2EV logarithmic transformation on the each digital pixel data is carried out by determining the predetermined object brightness range including the average relative object brightness in the distance measurement zone as the logarithmic transformation zone, thus the distance measurement calculation is carried out based on the thus obtained 2EV transformation data (a second transformation data). According to the 2EV logarithmic transformation in the illustrated embodiment, the 2EV logarithmic transformation data is obtained by converting each of the digital pixel data into a corresponding 8-bit data (0 through 255 steps) while dividing the resolution power at 1EV into 128 steps.

In the illustrated embodiment, in order to serve as the predetermined object brightness range so that the above discussed 2EV logarithmic transformation can be carried out, there is provided a high object brightness range (between $\Delta$0EV and $\Delta$2EV) in which the difference value of brightness from the reference value 0EV (the highest brightness) is smaller than $\Delta$2EV, and also a low object brightness range (between $\Delta$2EV and $\Delta$4EV) in which the difference value of brightness from the reference value 0EV is equal to or greater than $\Delta$2EV.

The average relative object brightness as discussed above refers to the average value of the respective distance measurement zones by converting the 4EV transformation data into the value (converted value) obtained by subtracting this data from $\Delta$4EV (lowest object brightness). The average relative object brightness may be represented by using the average of pixel signals output from the distance measurement sensor 36 obtained per distance measurement zone.

FIG. 7A illustrates an example of the thus obtained 4EV transformation data, in which the difference of object brightness $\Delta$EV is represented by the perpendicular axis, and the distance measurement zone is represented by the horizontal axis. The CPU 21 obtains the difference between the maximum and minimum values of the 4EV transformation data in respective distance measurement zones, and if, for example, the difference value is equal to or smaller than 1EV, the contrast is determined as being low. Whether the contrast is high or low is subject to arbitrary determination, and can be determined based on the sum of the absolute value of the difference of digital pixel data adjacent to each other.

As illustrated in FIG. 7C, the 4EV transformation data is used for the distance measurement calculation in the distance measurement zone C, since a sufficient high contrast of the 4EV transformation data can be obtained in this zone.

On the other hand, the respective 2EV transformation data are obtained in the distance measurement zones L and R in which the contrast has been determined as being low. As illustrated in FIG. 7A, since the average relative object brightness in the distance measurement zone L is approximately 3.8EV, a 2EV logarithmic transformation on each digital pixel data is carried out by using the transformation range of high object brightness between Δ0EV and Δ2EV, whereby the 2EV transformation data as illustrated in FIG. 7B is obtained.

Furthermore, since the distance measurement zone R has the average relative object brightness at about 1EV, the 2EV logarithmic transformation on digital pixel data is carried out by using the transformation range of low object brightness between Δ2EV and Δ4EV, whereby the 2EV transformation data as illustrated in FIG. 7D is obtained.

As discussed above, it is the characteristic of the illustrated embodiment that the object brightness zone, in which the logarithmic transformation on digital pixel data is carried out, is changed corresponding to the state of contrast in the distance measurement zone.

Figure 8:
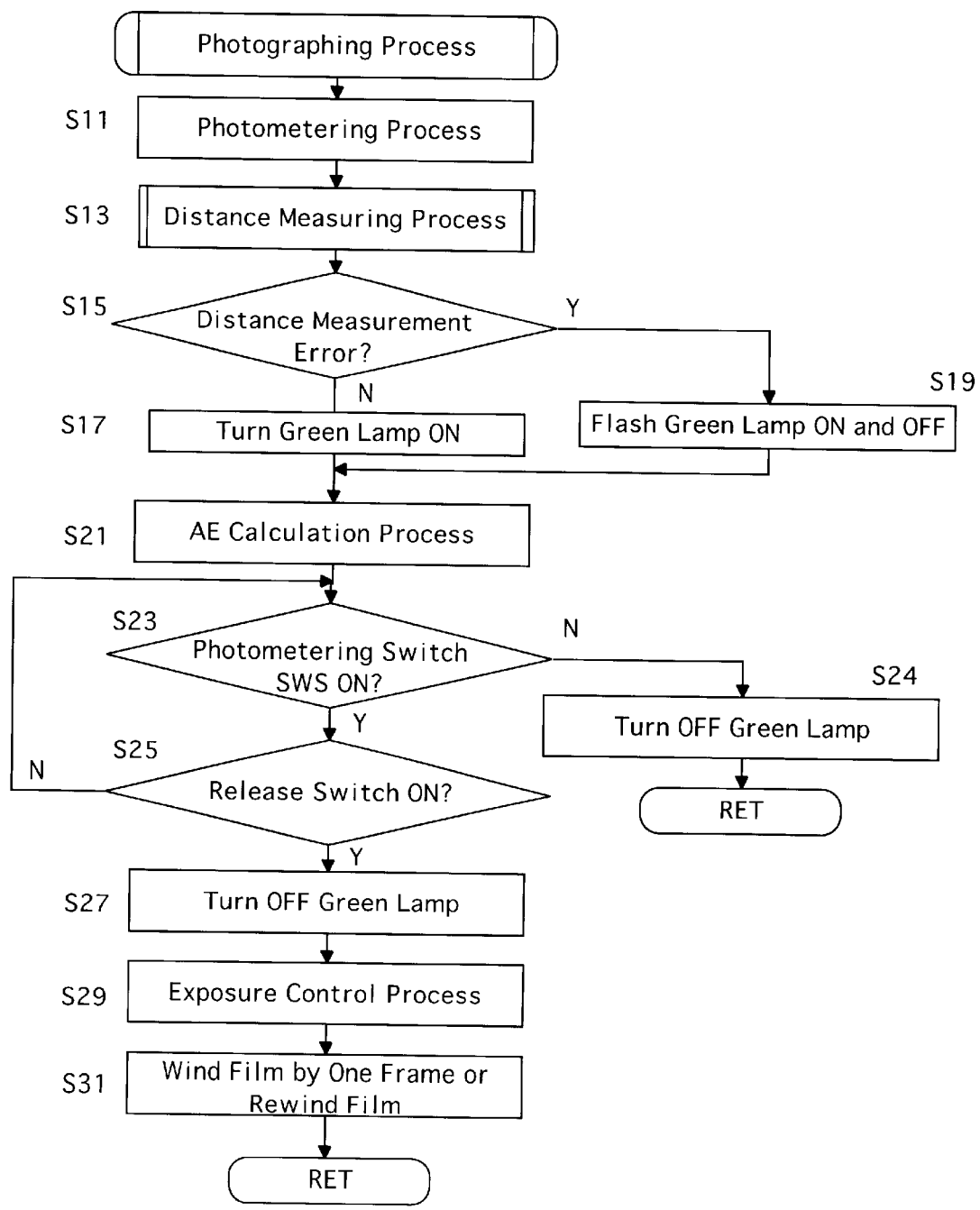
FIG. 8 is a flow chart showing the photographing process of the lens-shutter camera shown in FIG. 1.

The operation of the camera 1 will be hereinafter discussed with reference to flow charts shown in FIGS. 8 through 12. FIG. 8 is a flow chart showing the photographing process of the camera 1. This process is performed upon the photometering switch SWS being turned ON.

In the photographing process, the photometering process and the distance measuring process are carried out (S11; S13). In the photometering process, the object brightness (photometering data) in the entire picture plane and in each photometering zone that overlaps each distance measuring zone is determined. In the distance measuring process, the calculated distance value of the object is obtained for each distance measuring zone and if an appropriate distance value which meets the predetermined conditions is obtained, the focusing motor 30 is driven in accordance with the calculated distance value. Note that the photometering data thus obtained is stored in the RAM 21a.

After the distance measuring process is performed at step S13, it is determined whether a distance measurement error flag is 1 (step S15). If the distance measurement error flag is set to 1 (i.e., if an appropriate calculated distance value cannot be obtained in the distance measuring process), control proceeds to step S19 at which the green light emitter 11 is controlled to flash ON and OFF (blink) so as to warn the user. If the distance measurement error flag is set to 0, control proceeds to step S17 at which the green light emitter 11 is controlled to light up. Subsequently, an AE calculation process is performed (step S21). In the AE calculation process, the optimum shutter speed and the optimum aperture value are calculated in accordance with the object brightness in the entire picture plane, ISO film speed input via the DX code input circuit 45, and other factors.

Subsequently, it is determined whether the photometering switch SWS is ON (step S23). If the photometering switch SWS is not ON, the green light emitter 11 is turned OFF (step S24), and then control ends. If the photometering switch SWS is ON, it is determined whether the release switch is ON (step S25). If it is determined at step S25 that the release switch is not ON, control returns to step S23 to wait for either the photometering switch SWS to be turned OFF or the release switch SWS to be turned ON. Upon the release switch SWR being turned ON, the green light emitter 11 is turned OFF (step S27). Subsequently, an exposure control process in which the diaphragm control circuit 25 is controlled to stop down the diaphragm of the zoom lens 2 in accordance with the calculated exposure value is performed (step S29).

Thereafter, the film wind motor 28 is driven to rotate in a forward direction via the film wind circuit 27 to wind the film by one frame (step S31). However, after the last frame of the film is exposed, the film wind motor 28 is driven to rotate in a reverse direction via the film wind circuit 27 to rewind the film. Thereafter control ends.

The distance measuring process performed at step S13 in FIG. 9A, will be hereinafter discussed in detail with reference to FIG. 9A.

In this process, the distance measuring sensor 36 begins integration (step S101). When any of the pixel signals of the distance measuring sensor 36 reaches an integration completion value, the integration of the distance measuring sensor 36 is completed, and the pixel signal is input in order to carry out an A/D input and the 4EV logarithmic transformation (step S103). The A/D input and the 4EV logarithmic transformation processes serve to obtain the digital pixel data by converting the pixel signal output from the distance measuring sensor 36 by 10-bit A/D conversion, and also serve to obtain the 4EV transformation data through the 4EV logarithmic transformation of the digital pixel data.

Thereafter, a variable 'j' serving to identify the distance measurement zone is set to '0' (step S105). The 4EV transformation data in the distance measurement zone [j] is converted to that obtained by subtracting thereof from Δ4EV (the lowest object brightness), the obtained values (converted values) are averaged, and eventually the average is stored in the RAM 21a as the average relative object brightness 'af_ave [j]' (step S107). The variable 'j' is incremented by 1 (step S109), and it is determined whether or not the variable 'j' reaches a total number of distance measurement zones (step S111). If it is determined at step S111 that the variable 'j' is smaller than the total number of distance measurement zones, then control returns to step S107. Steps S107 through S111 are repeated until the variable 'j' reaches the total number of distance measurement zones, whereby the average relative object brightness 'af_ave [j]' in every distance measurement zone is obtained.

When it is determined at step S111 that the variable 'j' reaches the total number of the distance measurement zones, the variable 'j' is set to '0' (step S113) and the distance measurement is carried out based on the 4EV transformation data (step S115).

Subsequently, it is determined whether or not the contrast of distance measurement zone [j] is low (step S117). In the illustrated embodiment, if the difference between the maximum value and the minimum value of the 4EV transformation data is equal to or smaller than a predetermined value, the contrast is determined as being low. If the contrast of the distance measurement zone [j] is determined as not being low at step S117, then control proceeds to step S137.

When the contrast of the distance measurement zone [j] is determined as being low at step S117, a start address 's_adr [j]' of an array of photoelectric conversion elements (the line sensors 36b), serving to measure the distance in the corresponding distance measurement zone [j], is set to a variable [a] (step S119), and a variable 'i' is set to '0' (step S121). Thereafter, it is determined whether or not a value 'AF_AD [a+i]' obtained through 10-bit A/D conversion of the pixel signal output by the photoelectric conversion element located at [a+i] is smaller than the A/D conversion value of reference voltage Vref (step S123).

If it is determined at step S123 that the value 'AF_AD [a+i]' is smaller than the reference voltage value Vref, the value obtained by subtracting the value 'AF_AD [a+i]' from the A/D conversion value of the reference voltage Vref is stored in the RAM 21a as a WDATA value (step S125). If it is determined at step S123 that the value 'AF_AD [a+i]' is equal to or greater than the reference voltage value Vref, 0 (zero) is stored in the RAM 21a as the WDATA value (step S127). According to the illustrated embodiment, the 10-bit A/D conversion is done for the pixel signal by allotting '0' to 0 volts and '1023' to the reference voltage Vref. Hence, the value 'AF_AD [a+i]' becomes smaller as the object brightness of the corresponding portion becomes higher, and the WDATA value becomes larger as the object brightness of the corresponding portion becomes higher.

Thereafter, 2EV logarithmic transformation is carried out at step S129. Subsequently, the variable 'i' is incremented by 1 at step S131, and it is determined whether or not the variable 'i' reaches the total number of the photoelectric conversion elements measuring the object distance in the distance measurement zone [j] (step S133). If it is determined at step S133 that the variable 'i' is smaller than the total number of the photoelectric conversion elements measuring the object distance in the distance measurement zone [j], control returns to step S123. On the other hand, if it is determined at step S133 that the variable 'i' has reached the total number of the photoelectric conversion elements measuring the object distance in the distance measurement zone [j], the distance measurement calculation is carried out based on the obtained 2EV transformation data (step S135).

Subsequently, the variable 'j' is incremented by 1 at step S137, and it is determined whether or not the variable 'j' reaches the total number of the distance measurement zones (step S139). If it is determined at step S139 that the variable 'j' is smaller than the total number of the distance measurement zones, control returns to step S115. The processes from step S115 to step S139 are repeatedly performed until the variable 'j' reaches the total number of the distance measurement zones, whereby the distance measurement calculation value is obtained in every distance measurement zone.

If it is determined at step S139 that the variable 'j' reaches the total number of the distance measurement zones, then it is determined whether or not the all values of the object distance obtained in the distance measuring calculation are effective (step S141). In the illustrated embodiment, when the reliability of the calculated value is above a predetermined value, the calculated value is judged effective. If no effective value is obtained at step S141, a measurement error flag is set to '1', and control is returned (step S143). If an effective distance value is obtained at step S141, the measurement error flag is set to '0' (step S145), and a calculated distance value which meets the predetermined conditions is selected (step S147). Consequently, the LL data is calculated based on the selected distance value (step S151), so that the lens drive process is performed in accordance with the LL data thus obtained, and control is returned.

The A/D input and the 4EV logarithmic transformation process which is carried out at step S103 will be discussed below with reference to the flow chart shown in FIG. 10 and also FIGS. 6A, 6B and 6C.

In this process, the variable 'i' is set to 0 (step S201). Then the A/D converter 21b is actuated in order to obtain the digital pixel data through 10-bit A/D conversion of the first pixel signal output from the distance measuring circuit 35 (step S203). As shown in FIGS. 6A and 6B, the value of pixel signal as well as that of digital pixel data becomes higher as the object brightness becomes lower. When it is determined at step S205 that the A/D conversion of the pixel signal is completed, the obtained digital pixel data is stored as a value 'AF_AD [i]' in the RAM 21a (step S207), whereby it is determined at step S209 whether the stored value 'AF_AD [i]' is smaller than the A/D conversion value of the reference voltage Vref.

If it is determined at step S209 that the value 'AF_AD [i]' is smaller than the A/D conversion value of the reference voltage Vref, the value obtained by subtracting the value 'AF_AD [i]' from the A/D conversion value of the reference voltage Vref is stored in the RAM 21a as the WDATA value (step S211). If it is determined at step S209 that the value 'AF_AD [i]' is equal to or greater than the reference voltage value Vref, 0 (zero) is stored in the RAM 21a as the WDATA value (step S213). As shown in FIG. 6B, the value 'AF_AD [i]' becomes larger as the object brightness of the corresponding portion becomes lower, and accordingly, the WDATA value becomes smaller as the object brightness of the corresponding portion becomes lower.

Thereafter, the A/D converter 21b is actuated again in order to start the A/D conversion of the subsequent pixel signal (step S215), and the 4EV logarithmic transformation is performed in order to obtain an i-th 4EV transformation data through 4EV conversion of the i-th WDATA value (step S217). Then the variable 'i' is incremented by 1 (step S219), and control waits at step S221 until it is determined that the A/D conversion which has been started at step S215 is completed.

When it is determined at step S221 that the A/D conversion is completed, then it is determined whether or not the variable 'i' reaches the total number of the photoelectric conversion elements of the line sensors 36b (step S223).

If it is determined at step S223 that the variable 'i' is smaller than the total number of the photoelectric conversion elements of the line sensor 36b, the digital pixel data obtained at step S221 is overwritten on the value 'AF_AD [i]' and the new data is stored in the RAM 21a (step S225). Subsequently, it is determined whether or not the overwritten value 'AF_AD [i]' is smaller than the A/D conversion value of the reference voltage Vref (step S227). If it is determined as step S227 that the overwritten value 'AF_AD [i]' is smaller than the A/D conversion value of the reference voltage Vref, the value obtained by subtracting the value 'AF_AD [i]' from the A/D conversion value of the reference voltage Vref is stored in the RAM 21a as the WDATA value (step S229). If it is determined at step S227 that the over written value 'AF_AD [i]' is equal to or greater than the reference voltage value Vref, 0 (zero) is stored in the RAM 21a as the WDATA value, and control returns to step S215 (step S231).

On the other hand, if it is determined at step S223 that the variable 'i' reaches the total number of the photoelectric conversion elements of the line sensors 36b, control is returned.

Figure 10:
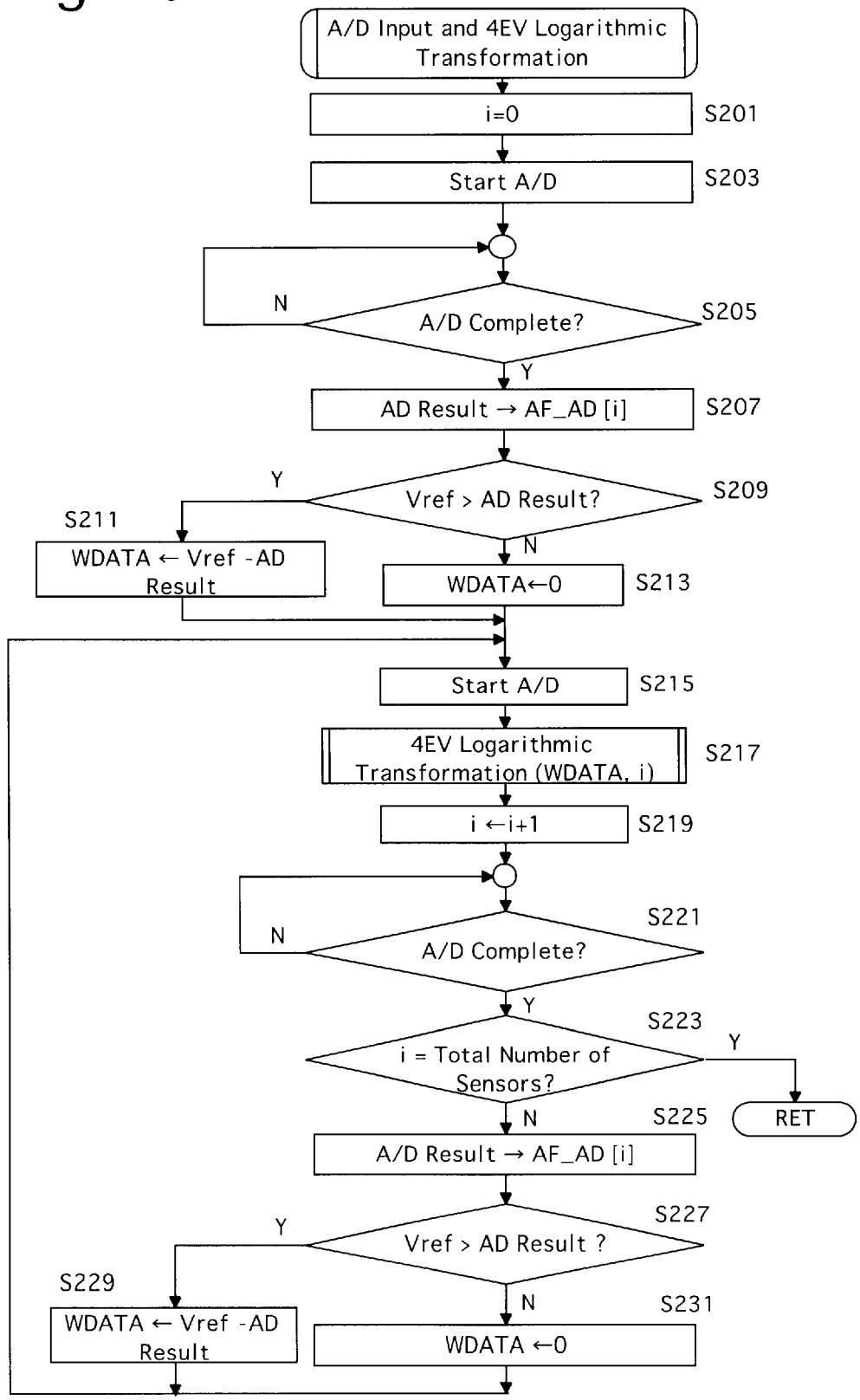
FIG. 10 is a flow chart showing the sensor data input process including the A/D conversion and 4EV logarithmic transformation performed in the distance measuring process shown in FIGS. 9A and 9B.
Figure 11:
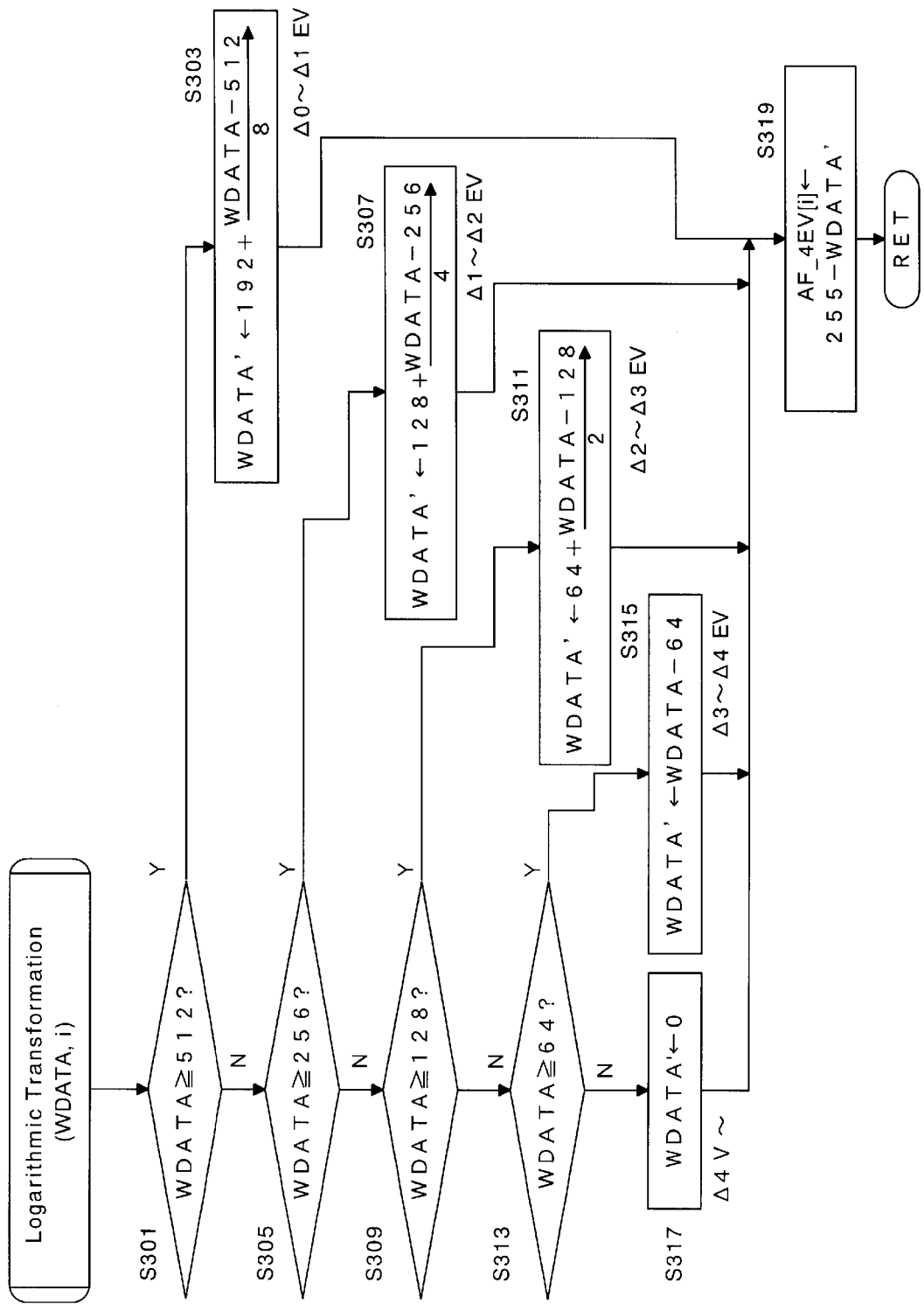
FIG. 11 is a flow chart showing the 4EV logarithmic process performed in the sensor data input process shown in FIG. 10.

The 4EV logarithmic transformation, which is carried out at step S217 of the A/D input and the 4EV logarithmic transformation process as shown in FIG. 10, will be discussed below with reference to the flow chart shown in FIG. 11 and also with reference to FIG. 6C.

This process is the transformation process in order to obtain 8-bit 4EV transformation data from the digital pixel data within the reference object brightness range in which the difference value from the reference 0EV (maximum object brightness) is between Δ0EV and Δ4EV.

If it is determined at step S301 that the WDATA value is equal to or greater than 512, a value WDATA' is obtained by a formula '192+(WDATA−512)/8' (step S303) and a value obtained by subtracting this WDATA' value from 255 is stored in the RAM 21a as the value 'AF_4EV [i]' (step S319). Thus the resolving power between Δ0EV and Δ1EV becomes 64 steps.

If it is determined at step S301 that the WDATA value is smaller than 512, control proceeds to step S305. Thereafter, if it is determined at step S305 that the WDATA value is equal to or greater than 256, the value WDATA' is obtained by a formula '128+(WDATA−256)/4' (step S307) and a value obtained by subtracting this WDATA' value from 255 is stored in the RAM 21a as the value 'AF_4EV [i]' (step S319). Thus the resolving power between Δ1EV and Δ2EV becomes 64 steps.

If it is determined at step S305 that the WDATA value is smaller than 256, control proceeds to step S309. Thereafter, if it is determined at step S309 that the WDATA value is equal to or greater than 128, the value WDATA' is obtained by a formula '64+(WDATA−128)/2' (step S311) and a value obtained by subtracting this WDATA' value from 255 is stored in the RAM 21a as the value 'AF_4EV [i]' (step S319). Thus the resolving power between Δ2EV and Δ3EV becomes 64 steps.

If it is determined at step S309 that the WDATA value is smaller than 128, control proceeds to step S313. Thereafter, if it is determined at step S313 that the WDATA value is equal to or greater than 64, the value WDATA' is obtained by a formula 'WDATA−64' (step S315) and a value obtained by subtracting this WDATA' value from 255 is stored in the RAM 21a as the value 'AF_4EV [i]' (step S319). Thus the resolving power between Δ3EV and Δ4EV becomes 64 steps.

If it is determined at step S313 that the WDATA value is smaller than 64, 0 (zero) is stored in the RAM 21a as the WDATA' value (step S317) and a value obtained by subtracting this WDATA' value from 255 is stored in the RAM 21a as the value 'AF_4EV [i]' (step S319). Consequently, the 4EV transformation data in the low object brightness range in which the difference of object brightness from the reference 0EV is equal to or greater than Δ4EV is 255 at all times.

According to the 4EV logarithmic transformation as discussed above, there may be provided the 4EV transformation data in which the resolving power between Δ0EV and Δ4EV is substantially equivalent.

Figure 9A:
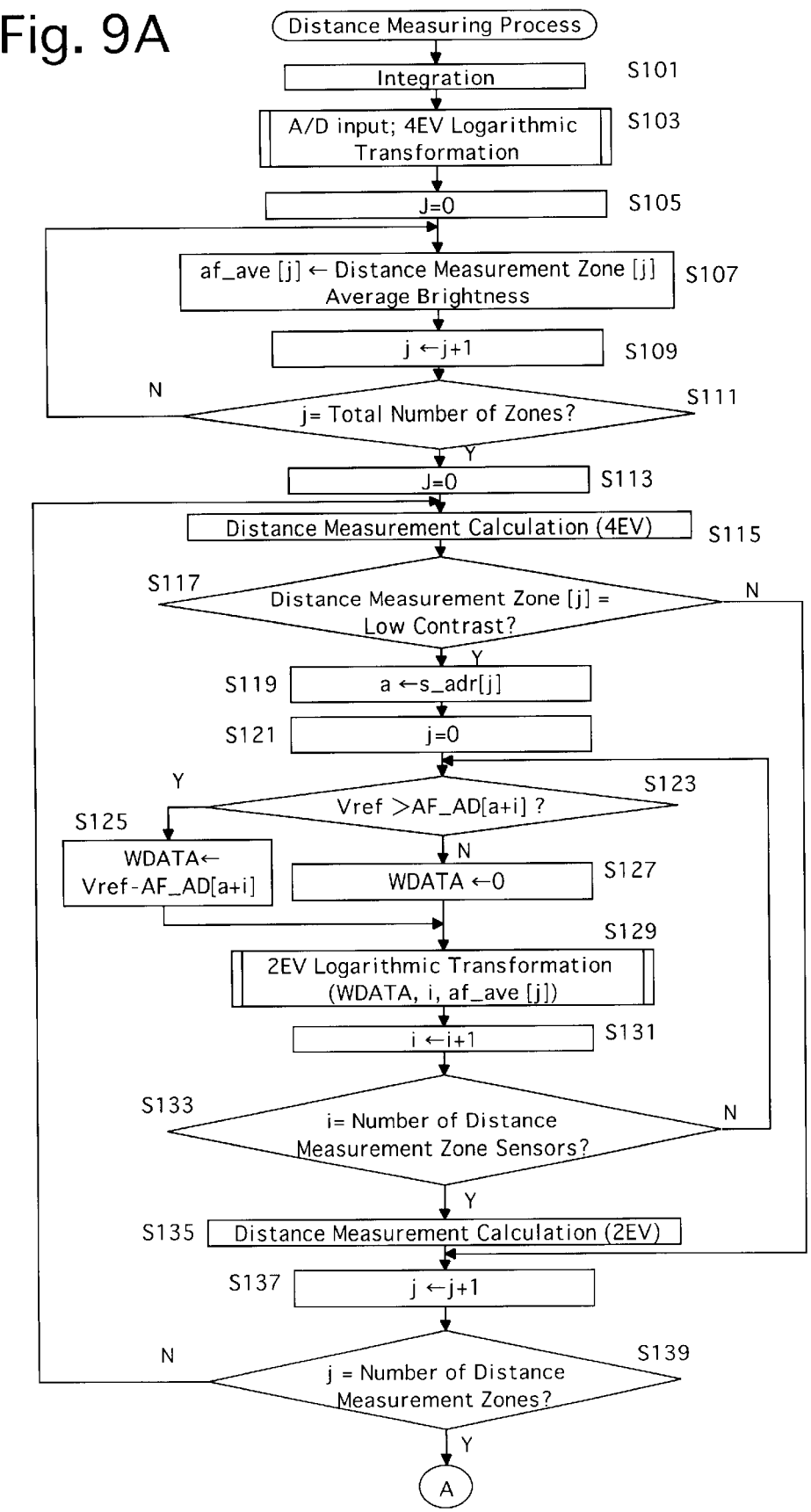
FIG. 9A is a flow chart showing the distance measuring process performed in the photographing process shown in FIG. 8.
Figure 9B:
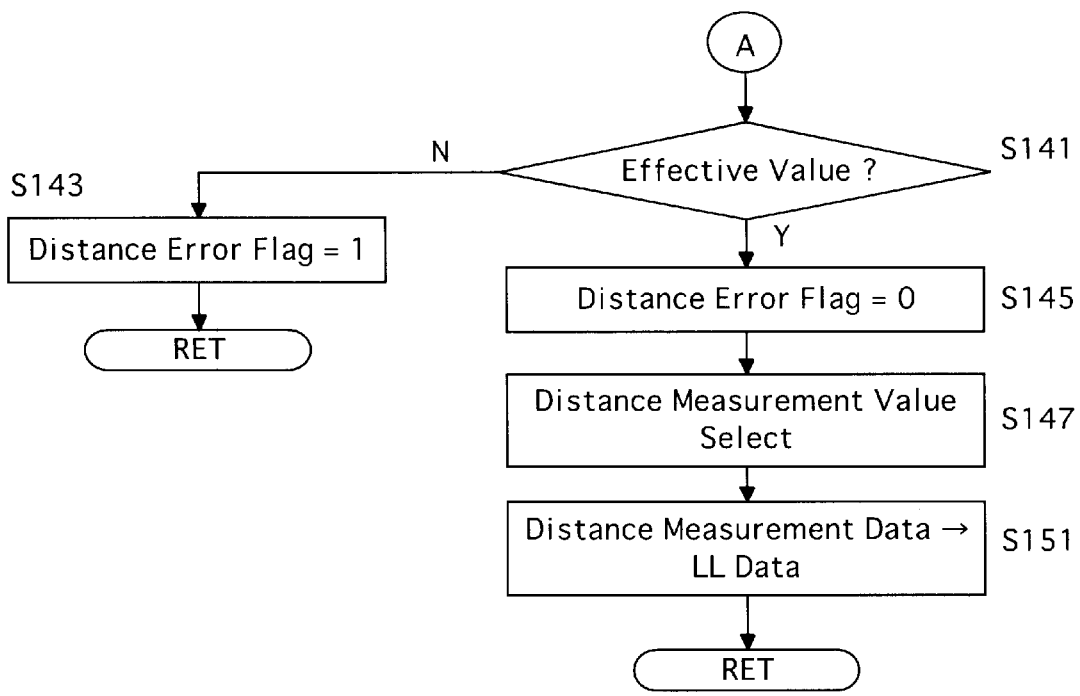
FIG. 9B is a flow chart showing the distance measuring process performed in the photographing process shown in FIG. 8.
Figure 12:
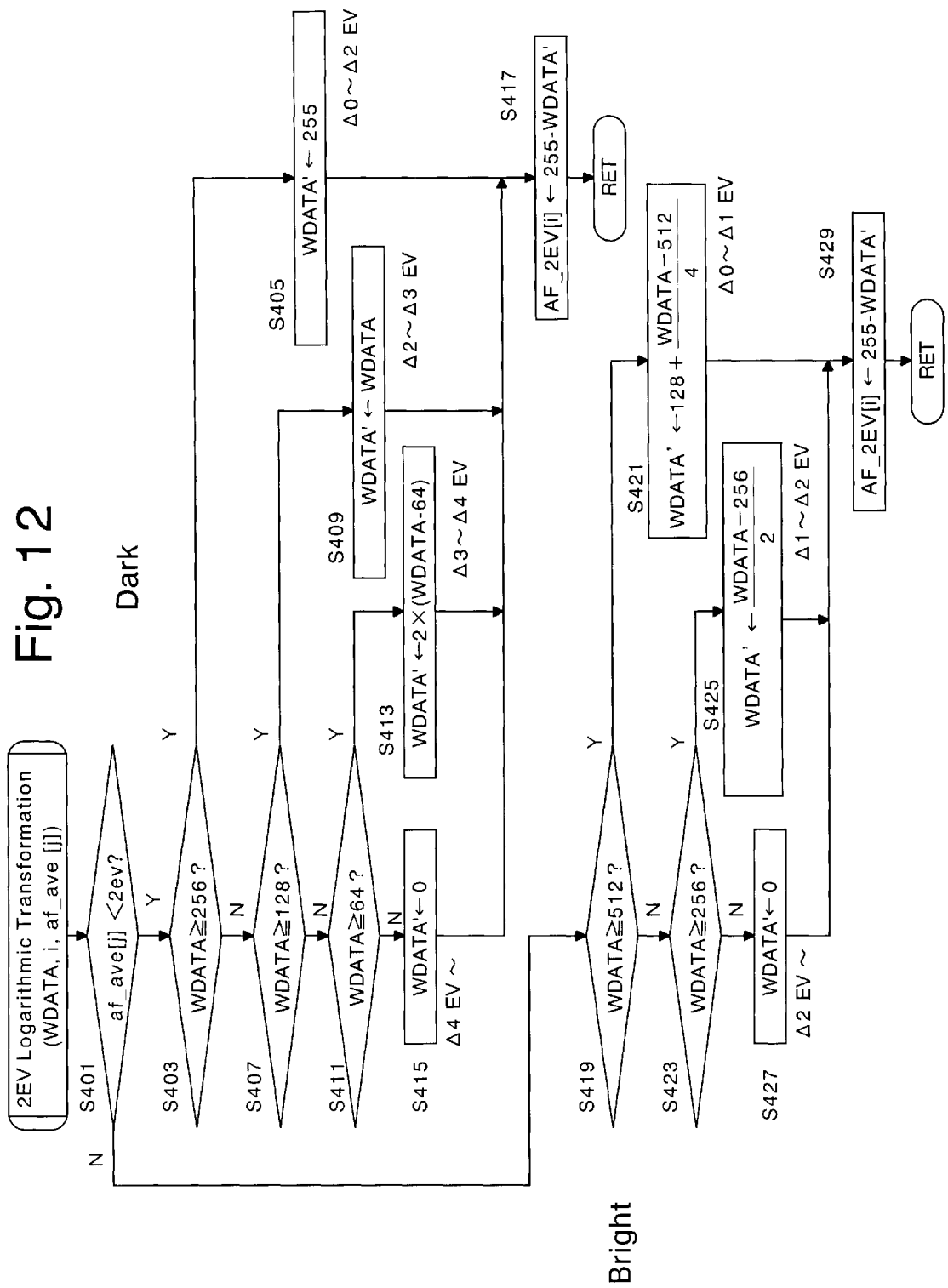
FIG. 12 is a flow chart showing the 2EV logarithmic process performed in the distance measuring process shown in FIGS. 9A and 9B.

The 2EV logarithmic transformation which is carried out at step S129 of the distance measuring process as shown in FIGS. 9A and 9B, will be discussed below with reference to the flow chart shown in FIG. 12 and also with reference to FIGS. 7A, 7B and 7D.

The 2EV logarithmic transformation is carried out as for the distance measurement zone in which it has been determined at step S117 that the contrast is low. This 2EV logarithmic transformation serves to obtain the 2EV transformation data in which the high resolution power is obtained in a predetermined object brightness range including the average relative object brightness in the distance measurement zone.

This process starts with the determination whether or not a value 'af_ave [j]' representing the average relative object brightness is smaller than a predetermined value of 2EV (step S401) in order to determine whether the average relative object brightness 'af_ave [j]' is included in a high object brightness range or in a low object brightness range. The high object brightness range corresponds to the range of the WDATA value of FIGS. 6A, 6B and 6C being equal to or greater than 256 and being smaller than 1023, i.e. between Δ0EV and Δ2EV of FIGS. 7A and 7B. The low object brightness range corresponds to the range of the WDATA value being equal to or greater than 64 and being smaller than 256, i.e. between Δ2EV and Δ4EV of FIGS. 7A and 7D.

If it is determined at step S401 that the average relative object brightness 'af_ave [j]' is smaller than the 2EV value, control proceeds to step S403 to carry out the process from step S403 to step S417. As this is the case of low object brightness and low contrast, the 2EV logarithmic transformation is carried out so that a high resolving power is obtained in the low object brightness range.

If it is determined at step S403 that the WDATA value is equal to or greater than 256, 255 is stored in the RAM 21a as the WDATA' value (step S405). Thereafter, a value 0 (zero) obtained by subtracting the WDATA' value from 255 is stored in the RAM 21a as a value 'AF_2EV[i]' (step S417) Thus the 2EV transformation data in the high object brightness range between Δ0 and Δ2EV is always converted to 0.

If it is determined at step S403 that the WDATA value is smaller than 256, control proceeds to step S407. Thereafter, if it is determined at step S407 that the WDATA value is equal to or greater than 128, the WDATA value is stored in the RAM 21a as the WDATA' value (step S409). Thereafter, a value obtained by subtracting the WDATA' value from 255 is stored in the RAM 211a as the value 'AF_2EV [i]' (step S417). Thus the resolving power between Δ2EV and Δ3EV becomes 128 steps, i.e. the double of that of the 4EV transformation data.

If it is determined at step S407 that the WDATA value is smaller than 128, control proceeds to step S411. Thereafter, if it is determined at step S411 that the WDATA value is equal to or greater than 64, the value obtained by a formula '2×(WDATA−64)' is stored in the RAM 21a as the WDATA' value (step S413). Then a value obtained by subtracting the WDATA' value from 255 is stored in the RAM 21a as the value 'AF_2EV [i]' (step S417). Thus the resolving power between Δ3EV and Δ4EV becomes 128 steps, i.e. the double of that of the 4EV transformation data.

If it is determined at step S411 that the WDATA value is smaller than 64, a value 0 (zero) is stored in the RAM 21a as the WDATA' value (step S415). Thereafter, a value obtained by subtracting the WDATA' value (0) from 255, i.e. 255, is stored in the RAM 21a as the value 'AF_2EV [i]' (step S417). Thus the 2EV transformation data in the range of which the difference of object brightness from the reference value 0EV is greater than Δ4EV is always converted to 0.

According to the 2EV logarithmic transformation process as discussed above, the high resolving power is obtained in the low object brightness range including the average relative object brightness 'af_ave [j]'. Hence, it is possible to obtain numerically high-contrast 2EV transformation data as shown in FIG. 7D even in the case of the distance measurement zone R having both low object brightness and low contrast (see FIG. 7A).

If it is determined at step S401 that the average relative object brightness 'af_ave [j]' is equal to or greater than the 2EV value, control proceeds to step S419 to carry out the process from step S419 to step S429. As this is the case of high object brightness and low contrast, the 2EV logarithmic transformation is carried out so that the high resolving power is obtained in the high object brightness range.

If it is determined at step S419 that the WDATA value is equal to or greater than 512, a value obtained by a formula '128+(WDATA−512)/4' is stored in the RAM 21a as the WDATA' value (step S421). Thereafter, a value obtained by subtracting the WDATA' value from 255 is stored in the RAM 21a as a value 'AF_2EV [i]' (step S429). Thus the resolving power between Δ0EV and Δ1EV becomes 128 steps, i.e. the double of that of the 4EV transformation data.

If it is determined at step S419 that the WDATA value is smaller than 512, control proceeds to step S423. Thereafter, if it is determined at step S423 that the WDATA value is equal to or greater than 256, a value obtained by a formula '(WDATA−256)/2' is stored in the RAM 21a as the WDATA' value (step S425). Thereafter, a value obtained by subtracting the WDATA' value from 255 is stored in the RAM 21a as a value 'AF_2EV [i]' (step S429). Thus the resolving power between Δ1EV and Δ2EV becomes 128 steps, i.e. the double of that of the 4EV transformation data.

If it is determined at step S423 that the WDATA value is smaller than 256, 0 (zero) is stored in the RAM 21a as the WDATA' value (step S427). Then a value obtained by subtracting the WDATA' value (0) from 255, i.e. 255, is stored in the RAM 21a as the value 'AF_2EV [i]' (step S429). Thus the 2EV transformation data in the low object brightness range of which the difference of object brightness from the reference value 0EV is greater than Δ2EV is always converted to 0.

According to the 2EV logarithmic transformation process as discussed above, the high resolving power is obtained in the high object brightness range including the average relative object brightness 'af_ave [j]'. Hence, it is possible to obtain numerically high-contrast 2EV transformation data as shown in FIG. 7B even in the case of the distance measurement zone L having high object brightness and low contrast (see FIG. 7A).

As discussed above, according to the illustrated embodiment, the object brightness range, in which the logarithmic transformation on the digital pixel data, is performed is changed according to the contrast state of distance measurement zone. If the contrast of the distance measurement zone is low, 2EV logarithmic transformation is performed in the predetermined object brightness range including the average relative object brightness, whereby it is possible to obtain 2EV transformation data having numerically high contrast. Since the distance measurement calculation is carried out based on this 2EV transformation data, it is possible to obtain the accurate distance measurement calculation value even in the case of an object having low contrast, irrespective of low or high object brightness thereof. Accordingly, it is no longer required to repeatedly carry out the distance measurement calculation by using various transformation data having different logarithmic transformation ranges, thus the distance measurement calculation can be sped up.

Although in the illustrated embodiment the average relative object brightness is obtained for every distance measurement zone before determining whether or not the contrast is low, it is also possible to obtain the average relative object brightness only for the distance measurement zone that has been determined as the contrast being low.

In the illustrated embodiment, since the logarithmic transformation range can be changed to 2EV logarithmic transformation which is narrower than the 4EV logarithmic transformation in addition to the change of the object brightness zone of the digital pixel data to which the logarithmic transformation is performed, a higher resolving power can be obtained. It is of course possible for the logarithmic transformation range to remain unchanged.

Although the illustrated embodiment is applied to a passive-type distance measuring apparatus provided in a lens shutter type AF camera, the illustrated embodiment can be applied, e.g. to a passive-type distance measuring apparatus provided in an SLR AF camera.

According to the present invention, it is possible to obtain transformation data numerically having high contrast even in the distance measurement zone of which contrast is low and of which object brightness is either low or high. In addition, it is also possible to obtain the distance measurement calculation value having excellent accuracy. Hence, improvement of distance measurement accuracy as well as the speeding up of the distance measurement process may be accomplished.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A distance measuring apparatus for a camera having a plurality of distance measurement zones, comprising:
   a light receiving device having a plurality of light sensors, wherein each of the light sensors receives light from an object in each of the distance measurement zones and outputs an analog pixel signal corresponding to the amount of light received;
   an A/D converter which converts each of the analog pixel signals into digital pixel data;
   a logarithmic transformation device which performs logarithmic transformation on each of the digital pixel data at a predetermined logarithmic transformation range to obtain a first transformation data;
   a determination device which determines a contrast state of each of the distance measurement zones based on said first transformation data in each of the distance measurement zones;
   a calculation device which calculates an average relative object brightness based on said first transformation data in each of the distance measurement zones; and
   a control device which obtains a second transformation data by performing logarithmic transformation again via said logarithmic transformation device on each of the digital pixel data in the distance measurement zone, which has been determined by said determination device as having a low contrast, by utilizing a predetermined object brightness range, including the average relative object brightness in the distance measurement zone, as a logarithmic transformation range.

2. The distance measuring apparatus for a camera according to claim 1, wherein said calculation device further calculates distance measurement based on said first transformation data in the distance measurement zone which has been determined by said determination device as not having a low contrast, and said calculation device further performs distance measurement based on said second transformation data in the distance measurement zone which contrast has been determined by said determination device as having a low contrast.

3. The distance measuring apparatus for a camera according to claim 1, wherein said calculation device subtracts said first transformation data from a predetermined reference value to thereby obtain a converted value, in order to obtain an average relative object brightness of each of the distance measurement zones by averaging said converted value per distance measurement zone.

4. The distance measuring apparatus for a camera according to claim 1, wherein said determination device obtains a difference between a maximum value and a minimum value of said first transformation data in each of the distance measurement zones, and determines that a contrast of distance measurement zones is low when said difference is equal to or smaller than a predetermined value.

5. The distance measuring apparatus for a camera according to claim 1, wherein said control device instructs the logarithmic transformation device to perform a logarithmic transformation in a logarithmic transformation range narrower than said predetermined logarithmic transformation range.

6. The distance measuring apparatus for a camera according to claim 1, further comprising at least one memory for storing each of the digital pixel data, the first transformation data and the second transformation data.

7. The distance measuring apparatus for a camera according to claim 1, wherein a higher resolving power is applied to the digital pixel data of a low-contrast distance measurement zone in the predetermined object brightness range when said determination device determines said low-contrast distance measurement zone has a low contrast.

8. The distance measuring apparatus for a camera according to claim 1, wherein the contrast state of each of the distance measurement zones determined by the determination device is one of high and low.

9. The distance measuring apparatus for a camera according to claim 1, wherein the second transformation data is obtained after determining whether an average relative object brightness is in a range that is higher or lower than a predetermined value.

10. A distance measuring apparatus for a camera having a plurality of distance measurement zones, comprising:

a light receiving device having a plurality of light sensors, wherein each of the light sensors receives light from an object in each of the distance measurement zones and outputs an analog pixel signal corresponding to the amount of light received;

an A/D converter which converts each of the analog pixel signals into digital pixel data;

a logarithmic transformation device which performs logarithmic transformation on each of the digital pixel data at a predetermined logarithmic transformation range to obtain a first transformation data;

a determination device which determines a contrast state of each of the distance measurement zones based on said first transformation data in each of the distance measurement zones;

a calculation device which calculates an average relative object brightness based on said first transformation data of the distance measurement zone which has been determined by said determination device as having a low contrast; and a control device which obtains a second transformation data by performing logarithmic transformation again via said logarithmic transformation device on each of the digital pixel data in the distance measurement zone by utilizing a predetermined object brightness range, including the average relative object brightness in the distance measurement zone, as a logarithmic transformation range.

11. A distance measuring apparatus having a plurality of distance measurement zones, comprising:

a light receiver that has a plurality of light sensors, each of the light sensors receiving light in each of the distance measurement zones from a object and outputting an analog pixel signal corresponding to the amount of light received;

an A/D converter that converts each of the analog pixel signals into digital pixel data;

a logarithmic transformer that performs logarithmic transformation on each of the digital pixel data in a predetermined logarithmic transformation range to obtain a first transformation data for each of the digital pixel data;

a determiner that determines a contrast state for each of the distance measurement zones based on said first transformation data of the respective distance measurement zone;

a calculator that calculates an average relative object brightness in each of the distance measurement zones based on said first transformation data of the respective distance measurement zone; and a controller that obtains a second transformation data, when said determination device determines a distance measurement zone has a low contrast, by again performing logarithmic transformation on each of the digital pixel data in the distance measurement zone in a predetermined object brightness range that includes the average relative object brightness, using said logarithmic transformation device.

* * * * *